Patented Jan. 26, 1932

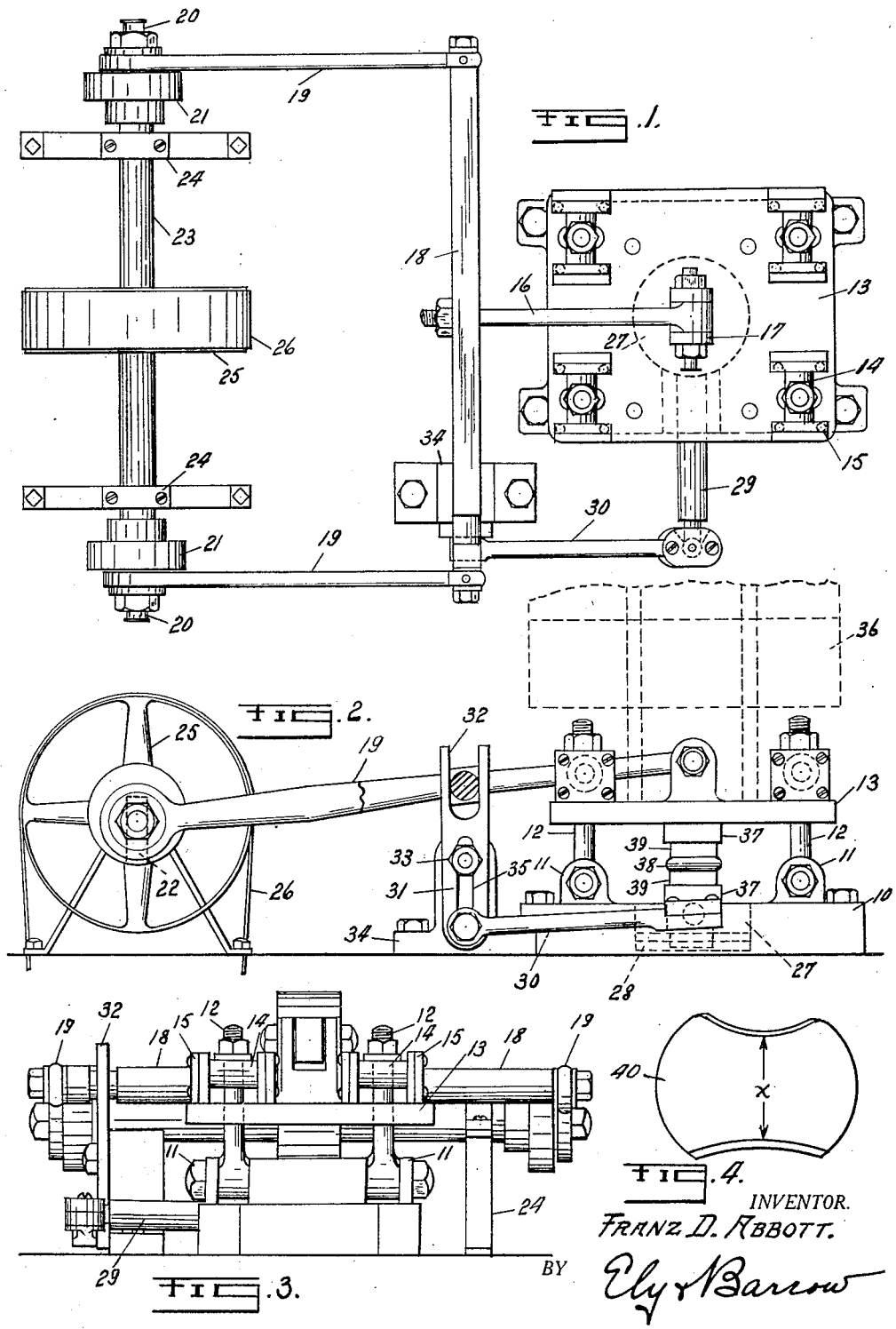

1,843,074

UNITED STATES PATENT OFFICE

FRANZ D. ABBOTT, OF AKRON, OHIO, ASSIGNOR TO THE FIRESTONE TIRE & RUBBER COMPANY, OF AKRON, OHIO, A CORPORATION OF OHIO

COMPRESSION FLEXOMETER AND METHOD OF TESTING RUBBER AND THE LIKE

Application filed August 27, 1928. Serial No. 302,214.

This invention relates to testing machines and particularly to apparatus for testing the combined effect of compression and flexure on resilient materials such as rubber, and to a method of testing rubber and the like.

Tests determining moduli and tensile strength, permanent set at break, hardness, etc., of rubber and the like are not of any value in determining the effect of flexure under compression or the amount of permanent set due to the fatigue or hysteresis loss resulting from flexure and heating of rubber while under compression. The general purpose of this invention, therefore, is to devise apparatus and procedure for testing rubber to determine such effects and to study rubber compounds which go into the manufacture of shock insulators, torque absorbers, flexible couplings and the like where the rubber is subjected in service to conditions of compression and flexure.

An object of the invention is to devise an apparatus comprising means for compressing a sample of rubber or like material to be tested and means for rapidly flexing the material to and fro in a straight-line direction, or angularly or both while under compression. Another object of the invention is to devise a simple and effective machine for testing the effect of compression and flexure on rubber or like material. A further object is to devise a method of procedure in the testing of rubber and the like to determine the effect of compression and flexure and to gauge the degree of temporary and permanent set or to measure the time required to produce a "blowout" of the test specimen.

The foregoing and other objects are obtained by the devices illustrated in the accompanying drawings and described below. It is to be understood that the invention is not limited to the specific forms thereof disclosed herein.

Of the accompanying drawings,

Figure 1 is a plan view of an apparatus embodying the principles of the invention;

Figure 2 is a side elevation thereof partly broken away;

Figure 3 is an end elevation thereof; and

Figure 4 is an elevation of a specimen which has been tested.

Referring in detail to the drawings, the numeral 10 denotes a base plate provided with bearings 11, 11 in which are journaled bolts 12, 12 for clamping the top plate 13. Each bolt 12 passes through a trunnion 14 journaled in a bearing 15 attached to the top of plate 13. A connecting arm 16 is pivoted at one end to a bearing 17 provided in the center of top plate 13, and is secured at the other end to a cross-head 18 which is reciprocable by means of connecting rods 19, 19 pivotally secured to crank pins 20, 20 eccentrically mounted with respect to rotatable heads 21, 21. Each head 21 is provided with a slot 22 whereby the eccentricity of the crank pin 20 with respect to head 21 may be adjusted to obtain any desired amplitude of movement in connecting rod 19. Heads 21 are affixed to shaft 23 suitably journaled in hangers 24, 24, the shaft being rotated by pulley 25 keyed thereto, and having trained thereover a belt 26 driven by any suitable source of power (not shown).

On base plate 10 is mounted an angularly movable plate 27 supported on a thrust bearing 28 and oscillatable by means of arm 29 connected thereto. Arm 29 is reciprocated in a horizontal plane by means of connecting rod 30 having ball and socket engagement therewith, connecting rod 30 being pivoted to a lever 31 actuated by cross-head 18. Lever 31 is formed with a yoke portion 32 for engagement with cross-head 18 and is pivoted adjacent its central portion by means of a pin 33 projecting from a support 34, lever 31 being formed with a slot 35 by means of which its point of pivotal engagement with pin 33 may be adjusted for varying the amplitude of movement of connecting rod 30. If desired, dead weight 36, as indicated by dotted lines in Figure 2, may be mounted on the top plate in order to maintain a constant pressure on the specimen irrespective of the clamping bolts. Suitable blocks 37, 37 are provided on the top plate 13 and base plate 10 for engagement with the specimen to be tested. These blocks may be formed with flat surfaces for engagement with cubical or flat specimens or with spherical or other shaped seats where other shapes of specimens are to be tested. Figure 2 illustrates mounted in the apparatus a specimen comprising a block of rubber 38 which has been vulcanized to metal plates 39, 39. Figure 4 illustrates a test specimen 40 comprising a plain block of rubber or like material which has been subjected to the flexing and compressing action of the apparatus and has been afterwards cut in half to show the sectional shape of the specimen.

In the operation of the device for testing the effect of compression and flexure on a sample of rubber or like material, the following preferred method of procedure has been devised.

A specimen is placed between blocks 37 when plate 13 is at its dead center position as shown in Figure 2, and compressed by tightening the nuts on bolts 12. While any degree of compression may be applied to suit the requirements of particular tests, it is found preferable in order to obtain uniform results to compress the specimen to one-half its normal thickness, this 50% deflection being measured by a suitable scale. The machine is then put in motion to reciprocate rapidly the top plate 13 and to oscillate the angularly movable bottom plate 27 or to carry out either of these motions individually, the frequency and amplitude of vibration of the plates being preferably in the order of 800 cycles per minute with a throw of three-eighths of an inch. It will be understood that only one flexing motion may be imparted to the specimen under compression, if desired, and that either connecting rod 30 or connecting rod 16 may be disconnected for this purpose in order to obtain respectively only the translatory motion or only the oscillatory motion, as desired.

The duration of flexure depends upon the size of the sample and upon the results to be obtained, varying from five minutes to two hours usually for testing permanent set of the material, or for longer periods of time where it is desired to obtain "blowout" of the specimen. The specimen is flexed for a suitable period of time, then removed, gauged to determine the minimum thickness and allowed to stand for another hour. The specimen is then bisected in a vertical plane in the direction of flexure by cutting down through the center of the material (Figure 4), and is again gauged to measure the minimum height $x$. The figures obtained may be used to calculate the percentage of temporary set in the rubber, the percentage of recovery and the percentage of permanent set.

In testing for "blowout" the specimen is flexed continuously until an explosion or sudden collapse of the material occurs due to intense heat and pressure developed in the material causing the internal portions to become molten. Where it is desired to speed up the test, the clamping blocks 37 may be made of a heat-insulating material. During the flexing action a rubber specimen is subjected to shearing and twisting stresses causing heat to be developed due to the internal friction of the rubber. This heat and flexure have different effects on various grades of rubber and usually cause poor grades to become distorted and permanently set to a greater degree than the better grades of rubber. The apparatus is especially useful in determining the quality of rubber compounds to be used in shock absorbers or the like where the rubber in service is subjected to compression and flexure. Where the rubber is to be bonded to metal plates, the apparatus is also valuable in determining the effect of flexure tending to separate the rubber from the metal to which it is vulcanized. In the latter test the specimen may be flexed without being placed under compression.

Modification of the construction and procedure disclosed herein may be resorted to without departing from the spirit of the invention or the scope thereof as defined by the appended claims.

What is claimed is:

1. Apparatus for testing rubber and the like, comprising top and bottom relatively movable plates between which a specimen to be tested may be clamped, bolts pivotally connected to each of said plates for clamping the same together to compress the specimen, an angularly oscillatable member mounted on the lower plate for engagement with the bottom of the specimen, means for reciprocating the top plate, means for oscillating said member, and means for adjusting the amplitudes of the reciprocation and the oscillation respectively of said plate and member.

2. Apparatus for testing rubber and the like, comprising top and bottom relatively movable plates between which a specimen to be tested may be clamped, bolts pivotally connected to each of said plates for clamping the same together to compress the specimen, an angularly oscillatable member mounted on the lower plate for engagement with the bottom of the specimen, means for reciprocating the top plate, and means for oscillating said member.

3. Apparatus for testing rubber and the like, comprising top and bottom relatively movable plates between which a specimen to be tested may be clamped, means for clamping said plates together to compress the specimen, an angularly oscillatable member mounted on the lower plate for engagement with the bottom of the specimen, means for reciprocating the top plate, and means for oscillating said member.

4. Apparatus for testing resilient and compressible material, said apparatus comprising upper and lower members between which a specimen to be tested may be clamped, one of said members being reciprocable with a translatory motion, the other of said members being angularly oscillatable, means for compressing said specimen between said members, means for reciprocating the first of said members, and means for oscillating the second of said members.

5. A machine for testing rubber or the like, comprising a pair of members for clamping a specimen to be tested, one of said members being reciprocable in a horizontal plane, the other of said members being angularly oscillatable in a plane substantially parallel to the plane of motion of the first member, means for urging said members relatively together to clamp a test specimen therebetween, means for reciprocating the first member, and means for oscillating the second member.

6. A machine for testing resilient compressible material, comprising means for compressing a test specimen, means for flexing one surface of the specimen to and fro with respect to another surface, and means for twisting the latter surface with respect to the first-named surface.

7. Material testing apparatus comprising a pair of specimen clamping members relatively movable in substantially parallel planes, means for compressing the specimen to be tested between said members, means for reciprocating one of said members, and means for angularly oscillating the other of said members.

8. Apparatus for testing rubber and the like, comprising upper and lower relatively movable plates between which a specimen to be tested may be clamped, bolts pivotally connected to each of said plates for clamping the same together to compress the specimen, and means for reciprocating one of said plates to flex the specimen.

9. Apparatus for testing rubber and the like, comprising upper and lower relatively movable plates between which a specimen to be tested may be clamped, bolts pivotally connected to each of said plates for clamping the same together to compress the specimen, an angularly oscillatable member mounted on one of said plates for engagement with one surface of the specimen, and means for oscillating said member to twist the specimen.

10. Apparatus for testing rubber and the like, comprising relatively movable plates between which a specimen to be tested may be clamped, means for clamping said plates together to compress the specimen, an angularly oscillatable member mounted on one of the plates for engagement with one surface of the specimen, and means for oscillating said member to twist the specimen alternately in reverse directions.

11. A machine for testing permanent distortion of resilient compressible materials due to flexure while under compression, said machine comprising means for compressing a test specimen of the material, and means for twisting one surface of the specimen to and fro relatively to an opposed surface thereof while the specimen is under compression.

12. Apparatus for testing rubber and the like, comprising means for compressing a specimen of the material, and means for relatively flexing to and fro two opposed surfaces of the specimen and distorting the body of rubber therebetween while the latter is under compression.

13. Apparatus for testing rubber and the like, comprising means for compressing a specimen of the material, and means for relatively angularly twisting two opposed surfaces of the specimen alternately in reverse directions while the latter is under compression.

14. Apparatus for testing rubber and the like, comprising means for applying a constant load on the specimen to be tested for compressing the same, and means for relatively flexing to and fro two opposed surfaces of the specimen and distorting the body of rubber therebetween while the latter is under compression.

15. Apparatus for testing rubber and the like, comprising means for applying a constant load on the specimen to be tested for compressing the same, and means for relatively angularly twisting two opposed surfaces of the specimen alternately in reverse directions while the latter is under compression.

16. A method of testing rubber or like material, comprising compressing a specimen of said material, flexing the specimen while it is under compression, releasing the compression, measuring the difference in dimensions from the original dimensions, permitting the specimen to recover, bisecting the specimen to disclose the degree of permanent distortion resulting from compression and flexure, and determining the amount of recovery and the amount of permanent distortion.

17. A method of testing rubber or like material, comprising compressing a specimen of said material, flexing the specimen laterally and angularly while it is under compression, releasing the compression, and measuring the amount of distortion of the specimen.

18. A method of testing rubber or like material, comprising compressing a specimen of said material, flexing the specimen to and fro while it is under compression to develop frictional heat therein and to distort the specimen, releasing the compression, and measuring the amount of distortion of the specimen.

19. A method of determining temporary and permanent set of rubber or the like when subjected to flexure and compression, which comprises compressing a specimen to be tested, reciprocably flexing one surface of the specimen with respect to an opposed surface, angularly twisting said opposed surface with respect to said first-named surface, releasing compression on the specimen, measuring variations of the specimen from its original dimensions, permitting the specimen to stand until recovered from its temporary set, and measuring again to determine permanent set.

20. A method of determining temporary and permanent set of rubber or the like when subjected to flexure and compression, which comprises compressing a specimen to be tested, reciprocably flexing one surface of the specimen with respect to an opposed surface, releasing compression on the specimen, measuring variations of the specimen from its original dimension, permitting the specimen to stand until recovered from its temporary set, and measuring again to determine permanent set.

21. A method of determining temporary and permanent set of rubber or the like when subjected to flexure and compression, which comprises compressing a specimen to be tested, angularly twisting one surface of the specimen with respect to an opposed surface, releasing compression on the specimen, measuring variations of the specimen from its original dimension, permitting the specimen to stand until recovered from its temporary set, and measuring again to determine permanent set.

In witness whereof I have hereunto affixed my signature this 14th day of August, 1928.

FRANZ D. ABBOTT.